US012030328B2

(12) United States Patent
Shimizu et al.

(10) Patent No.: US 12,030,328 B2
(45) Date of Patent: Jul. 9, 2024

(54) THERMOSENSITIVE RECORDING MEDIUM

(71) Applicants: Kenji Shimizu, Shizuoka (JP); Gaku Kohara, Shizuoka (JP); Marin Mio, Fukuoka (JP); Akira Suzuki, Kanagawa (JP)

(72) Inventors: Kenji Shimizu, Shizuoka (JP); Gaku Kohara, Shizuoka (JP); Marin Mio, Fukuoka (JP); Akira Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 448 days.

(21) Appl. No.: 17/439,425

(22) PCT Filed: Mar. 10, 2020

(86) PCT No.: PCT/JP2020/010408
§ 371 (c)(1),
(2) Date: Sep. 15, 2021

(87) PCT Pub. No.: WO2020/189422
PCT Pub. Date: Sep. 24, 2020

(65) Prior Publication Data

US 2022/0153052 A1 May 19, 2022

(30) Foreign Application Priority Data

Mar. 20, 2019 (JP) ................................ 2019-053736

(51) Int. Cl.
*B41M 5/42* (2006.01)
*B41M 5/44* (2006.01)

(52) U.S. Cl.
CPC .............. *B41M 5/44* (2013.01); *B41M 5/423* (2013.01); *B41M 5/426* (2013.01); *B41M 2205/04* (2013.01)

(58) Field of Classification Search
CPC .......... B41M 5/42; B41M 5/44; B41M 5/423; B41M 5/426; B41M 2205/04; B41M 2205/38
See application file for complete search history.

(56) References Cited

U.S. PATENT DOCUMENTS 4,975,408 A 12/1990 Votosugi et al.
5,231,068 A 7/1993 Miyamoto et al.
(Continued)

FOREIGN PATENT DOCUMENTS

CN 103079831 * 5/2013 ............. B41M 5/42
CN 105722868 6/2016
(Continued)

OTHER PUBLICATIONS

Japanese Office Action dated Mar. 22, 2023, in Japanese Application No. 2019-053736, 2 pages.
(Continued)

*Primary Examiner* — Anh T Vo
(74) *Attorney, Agent, or Firm* — Grüneberg and Myers PLLC

(57) ABSTRACT

A thermosensitive recording medium includes a base material; a thermosensitive recording layer; and an under layer disposed between the base material and the thermosensitive recording layer and containing a non-thermally-expandable hollow filler. The thermosensitive recording medium includes a hydrocarbon, where an amount of the hydrocarbon having from 3 through 16 carbon atoms is 0.2 mg/m$^2$ or more, relative to an area of the thermosensitive recording medium.

11 Claims, 3 Drawing Sheets

(56) References Cited

U.S. PATENT DOCUMENTS

| | | | |
|---|---|---|---|
| 8,461,076 | B2 | 6/2013 | Okada et al. |
| 8,530,379 | B2 | 9/2013 | Shimizu et al. |
| 9,023,756 | B2 | 5/2015 | Shimizu et al. |
| 2002/0094933 | A1 | 7/2002 | Iwasaki et al. |
| 2004/0087444 | A1 | 5/2004 | Naruse et al. |
| 2007/0112113 | A1 | 5/2007 | Yamaguchi et al. |
| 2009/0209419 | A1 | 8/2009 | Kitano |
| 2016/0310924 | A1 | 10/2016 | Nakatomi et al. |
| 2019/0152248 | A1 | 5/2019 | Noda et al. |

FOREIGN PATENT DOCUMENTS

| | | | | |
|---|---|---|---|---|
| EP | 0891875 | * | 1/1999 | B41M 5/36 |
| JP | 01-050600 | | 10/1989 | |
| JP | 04-220393 | | 8/1992 | |
| JP | 04-241987 | | 8/1992 | |
| JP | 05-000573 | | 1/1993 | |
| JP | 05-286248 | | 11/1993 | |
| JP | 05-318928 | | 12/1993 | |
| JP | H6-262857 | | 9/1994 | |
| JP | 08-132734 | | 5/1996 | |
| JP | 2002127628 | * | 5/2002 | B41N 1/24 |
| JP | 2003-080846 | | 3/2003 | |
| JP | 2004-106229 | | 4/2004 | |
| JP | 2004-114310 | | 4/2004 | |
| JP | 2007-162004 | | 6/2007 | |
| JP | 2009-190263 | | 8/2009 | |
| JP | 2010005895 | * | 1/2010 | B41M 5/42 |

OTHER PUBLICATIONS

International Search Report Issued Jul. 13, 2020 for counterpart International Patent Application No. PCT/JP2020/010408 filed Mar. 10, 2020.

Written Opinion Issued Jul. 13, 2020 for counterpart International Patent Application No. PCT/JP2020/010408 filed Mar. 10, 2020.

Korean Office Action dated Feb. 16, 2023, in Korean Application No. 10-2021-7033657, with English translation.

Chinese Office Action dated Dec. 1, 2022, in Chinese Application No. 202080021709.3, with English translation, 16 pages.

Japanese Office Action dated Oct. 18, 2022, in Japanese Application No. 2019-053736, 2 pages.

* cited by examiner

THERMOSENSITIVE RECORDING MEDIUM

CROSS-REFERENCE TO RELATED APPLICATIONS

This application is the National Stage entry under § 371 of International Application No. PCT/JP2020/010408, filed on Mar. 10, 2020, and which claims the benefit of priority to Japanese Application No. 2019-053736, filed on Mar. 20, 2019. The content of each of these applications is hereby incorporated by reference in its entirety.

TECHNICAL FIELD

The present disclosure relates to a thermosensitive recording medium

BACKGROUND ART

Thermosensitive recording media have been widely used in many fields such as the field of POS for, for example, perishable foods, box lunches, and delicatessen; the field of copying of, for example, books and documents; the field of communication such as facsimile; the field of ticketing such as ticketing machines, receipts, and signed receipts; and baggage tags in the airline industry.

The thermosensitive recording media have been typically produced by applying a thermosensitive color-developing liquid onto supports such as sheets of paper, sheets of synthetic paper, or synthetic resin films, and then drying. The thermosensitive color-developing liquid includes a color-developing component which may cause a color-developing reaction upon heating. When the thus-obtained thermosensitive recording media are heated with a stylus or a thermal head, color images are recorded on the thermosensitive recording media. Conventional thermosensitive recording media have low thermoresponsivity, resulting in unsatisfactory color density or preciseness in the case of rapid recording. Therefore, extensive studies have been conducted. For example, it has been proposed that hollow microparticles having an average particle diameter of from 2 micrometers through 10 micrometers and a rate of hollowness of 90% or higher or hollow microparticles having the average particle diameter of from 2.0 micrometers through 20 micrometers and the rate of hollowness of 80% or higher are used for an under layer. As a result, thermosensitive recording media having very high color developing sensitivity have been obtained (for example, see PTLs 1 and 2).

CITATION LIST

Patent Literature

PTL 1: Japanese Unexamined Patent Application Publication No. 04-241987
PTL 2: Japanese Unexamined Patent Application Publication No. 05-000573
PTL 3: Japanese Examined Patent Publication No. 01-050600

SUMMARY OF INVENTION

Technical Problem

The present disclosure has an object to provide a thermosensitive recording medium in which reduction in sensitivity due to calendaring is prevented, thereby being excellent in sensitivity and preciseness.

Solution to Problem

According to one aspect of the present disclosure, a thermosensitive recording medium of the present disclosure includes a base material, a thermosensitive recording layer, and an under layer. The under layer is disposed between the base material and the thermosensitive recording layer. The under layer contains a non-thermally-expandable hollow filler. The thermosensitive recording medium includes a hydrocarbon. An amount of the hydrocarbon having from 3 through 16 carbon atoms is 0.2 mg/m$^2$ or more relative to an area of the thermosensitive recording medium.

Advantageous Effects of Invention

The present disclosure can provide a thermosensitive recording medium in which reduction in sensitivity due to calendaring is prevented, thereby being excellent in sensitivity and preciseness.

DESCRIPTION OF EMBODIMENTS (Thermosensitive Recording Medium)

Figure 1A:
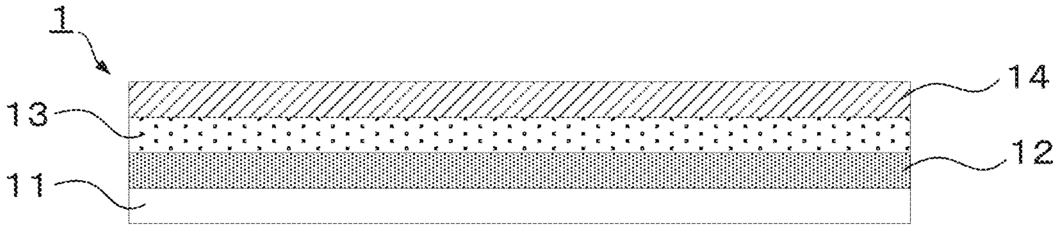
FIG. 1A is a schematic diagram illustrating an example of a thermosensitive recording medium of the present disclosure.

A thermosensitive recording medium of the present disclosure includes a base material, a thermosensitive recording layer, and an under layer. The under layer is disposed between the base material and the thermosensitive recording layer. The under layer includes a non-thermally-expandable hollow filler. The thermosensitive recording medium includes a hydrocarbon. An amount of the hydrocarbon having from 3 through 16 carbon atoms is 0.2 mg/m$^2$ or more relative to an area of the thermosensitive recording medium. The thermosensitive recording medium further includes a protective layer, a tackifier layer, and other layers, if necessary.

The present inventors conducted studies on a thermosensitive recording medium in which reduction in sensitivity due to calendaring is prevented, thereby being excellent in sensitivity and preciseness. As a result, the present inventors have obtained findings described below.

In the related art, thermosensitive recording media are formed and then subjected to calendaring (crushed by rolls with pressure) in order to smooth surfaces thereof.

As a result, hollow particles in an under layer disposed in the thermosensitive recording media are crushed, so that a satisfactory heat-retention and heat-insulation property is not secured and sensitivity is lowered. This is problematic.

Thermosensitive recording media in the related art also have a problem that satisfactory preciseness is not necessarily obtained because the hollow particles are crushed by calendaring to thereby deteriorate a filling property.

Moreover, it has also been proposed in the related art thermally-expandable thermosensitive recording paper which includes hollow particles including a thermoplastic material serving as capsule walls and a volatile low-boiling point hydrocarbon serving as a thermally expanding agent inside the particles. In this configuration, although the thermosensitive recording paper include the hydrocarbon, the hollow particles are produced only after heating. Therefore, the thermosensitive recording paper is unsatisfactory from the viewpoints of color developing sensitivity and preciseness.

—Hydrocarbon—

The hydrocarbon may be included anywhere in the thermosensitive recording medium and a layer in which the hydrocarbon is included may be appropriately selected depending on the intended purpose. For example, the hydrocarbon may be included in hollow fillers in an under layer.

A method for measuring the hydrocarbon having from 3 through 16 carbon atoms in the thermosensitive recording medium is not particularly limited and may be appropriately selected according to the intended purpose. For example, a headspace gas chromatographic method may be used under conditions below.

Note that, in the case where the thermosensitive recording medium include a tackifier, the tackifier is removed by, for example, using a solvent or dividing the thermosensitive recording medium in a direction orthogonal to a thickness direction so as to thin a thickness thereof to thereby remove one on which the tackifier is disposed. Thereafter, the thermosensitive recording medium from which the tackifier has been removed is subjected to measurement under conditions described below.

The tackifier refers to a material of at least one of a tackifier layer and an adhesive layer in the case where the thermosensitive recording medium includes at least one of the tackifier layer and the adhesive layer.

—Conditions for Measuring Hydrocarbon in Thermosensitive Recording Medium—

A weight of the hydrocarbon included in the thermosensitive recording medium may be measured by a headspace gas chromatographic method as follows.

First, 2.5 $cm^2$ of the thermosensitive recording medium including hollow fillers is weighed into a 20 mL headspace vial. This vial is sealed hermetically with a flu-ororesin-covered silicone gum septum and an aluminium cap. The thus-sealed headspace vial is heated at 170 degrees C. for 20 min and then pressured with helium for 0.5 min. Thereafter, 3 mL of a gas phase (headspace) is taken and introduced into a gas chromatograph to thereby measure a proportion by weight of the hydrocarbon in the thermosensitive recording medium.

Conditions under which the headspace gas chromatographic analysis is performed are as follows.

GC column: DB-624, available from Agilent Technologies, length: 30 m, inner diameter: 0.25 mm, film thickness: 1.40 micrometers)

Detector: FID, temperature: 200 degrees C.

Heating program: 40 degrees C. (6 min)→20 degrees C./min→200 degrees C. (hold for 3 min)

Inlet temperature: 200 degrees C.

Gas introduction amount: 3 mL

Helium flow rate: 1 mL/min

Split ratio: 10:1

Quantification: calibration-curve method (5 microliters of a solution in which a known amount of a sample is dissolved in DMF is taken into a 20 mL headspace vial. The headspace vial is sealed hermetically with a fluororesin-covered silicone gum septum and an aluminium cap. The thus-sealed headspace vial is heated at 170 degrees C. for 20 min and pressured with helium for 0.5 min. Thereafter, 3 mL of a gas phase (headspace) is taken and introduced into a gas chromatograph).

The hydrocarbon is not particularly limited as long as it vaporizes upon heating. Examples thereof include hydrocarbons having from 3 through 16 carbon atoms such as propane, (iso)butane, (iso)pentane, (iso)hexane, (iso)heptane, (iso)octane, (iso)nonane, (iso)decane, (iso)undecane, (iso)dodecane, (iso)tridecane, and (iso)hexadecane.

Non-thermally-expandable hollow fillers including the hydrocarbon in hollow portions are preferable because, when the fillers are used for the under layer of the thermosensitive recording medium, a vapor pressure of the hydrocarbon can prevent the hollow fillers from crushing upon calendaring, resulting in suppressing reduction in sensitivity.

A boiling point of the hydrocarbon is not particularly limited and may be appropriately selected according to the intended purpose. For example, the boiling point is preferably 60 degrees C. or lower and more preferably −15 degrees C. or higher but 40 degrees C. or lower.

The hydrocarbon having the boiling point of 60 degrees C. or lower is preferable because the vapor pressure of the hydrocarbon included in the hollow portions of the hollow fillers becomes high, so that, when the fillers are used for the under layer of the thermosensitive recording medium, the hollow fillers can be prevented from crushing upon calendaring, resulting in suppressing reduction in sensitivity.

An amount of the hydrocarbon is not particularly limited and may be appropriately selected according to the intended purpose. For example, the amount is preferably 0.2 $mg/m^2$ or more, more preferably 0.5 $mg/m^2$ or more but 200 $mg/m^2$ or less, further preferably 1.0 $mg/m^2$ or more but 190 $mg/m^2$ or less, and particularly preferably 2.0 $mg/m^2$ or more but 180 $mg/m^2$ or more, relative to an area of the thermosensitive recording medium. When the amount of the hydrocarbon is 0.2 $mg/m^2$ or more, the hollow fillers can be prevented from crushing upon calendaring, resulting in suppressing reduction in sensitivity.

Note that, the area of the thermosensitive recording medium denotes an area of a surface horizontal to the base material.

<Under Layer>

The under layer includes non-thermally-expandable hollow fillers, and, if necessary, further includes a binding resin, a cross-linking agent, and other components.

Note that, the non-thermally-expandable hollow fillers may be hereinafter referred to as hollow fillers or hollow particles, and the under layer may be hereinafter referred to as an undercoat layer, a heat retention layer, or an intermediate layer.

—Non-Thermally-Expandable Hollow Fillers—

The non-thermally-expandable hollow fillers include outer shells including a thermoplastic resin and hollow portions inside the outer shell, and further include air or other gases in the hollow portions. The non-thermally-expandable hollows are expanded hollow fillers obtained by heating thermally-expandable microspheres to cause foaming, i.e., hollow fillers which are not further expanded even if it is heated in the same manner. The other gases are not particularly limited and may be appropriately selected according to the intended purpose. Examples thereof include the hydrocarbon.

An amount of the hydrocarbon is not particularly limited and may be appropriately selected according to the intended purpose. For example, the amount is preferably 0.2% by mass or greater, more preferably 0.5% by mass or greater but 20.0% by mass or less, and further preferably 1.0% by mass or greater but 15.0% by mass or less, relative to a mass of the hollow filler. When the amount of the hydrocarbon is 0.2% by mass or greater, the hollow fillers can be prevented from crushing upon calendaring, resulting in suppressing reduction in sensitivity.

The hollow fillers are not particularly limited in regard to shape and size thereof, but preferably have a volume average particle diameter (Dv) and a rate of hollowness (%) as described below.

The volume average particle diameter (particle outer diameter) of the hollow fillers are not particularly limited and may be appropriately selected according to the intended purpose. The volume average particle diameter is preferably 1 micrometer or more but 10 micrometers or less and more preferably 1 micrometer or more but 6 micrometers or less. When the volume average particle diameter of the hollow fillers is 1 micrometer or more but 10 micrometers or less, the under layer can be improved in surface smoothness and thus printing preciseness can be better.

The volume average particle diameter of the hollow fillers may be measured using, for example, a laser diffraction/scattering particle size distribution measuring device (MICROTRAC ASVR, available from NIKKISO CO., LTD.).

An average rate of hollowness of the hollow fillers is not particularly limited and may be appropriately selected according to the intended purpose. The average rate of hollowness is preferably 71% or more but 95% or less, more preferably 80% or more but 95% or less, and particularly preferably 85% or more but 95% or less.

When the average rate of hollowness is 71% or more but 95% or less, heat insulation property can be sufficiently secured and heat energy can improve sensitivity of the thermosensitive recording medium through a support.

Note that, the rate of hollowness, as used herein, denotes a ratio between an outer diameter and an inner diameter (diameter of the hollow portion) of the hollow filler and expressed as the expression below. The average rate of hollowness is a value obtained by dividing the thus-calculated rate of hollowness by the number of the hollow fillers.

$$\text{Rate of hollowness (\%)}=(\text{Inner diameter of hollow particle}/\text{Outer diameter of hollow particle})\times 100$$

Note that, the hollow fillers include the outer shells including the thermoplastic resin as described above. The thermoplastic resin is not particularly limited and may be appropriately selected according to the intended purpose. Examples thereof include styrene resins, styrene-acrylic copolymer resins, polyvinyl chloride resins, polyvinylidene chloride resins, acrylonitrile resins, and methacrylic acid ho-mopolymers. The above-listed examples may be used alone or in combination.

A monomer component used for the hollow fillers is not particularly limited. Examples thereof include nitrile-based monomers such as acrylonitrile, methacrylonitrile, and fumaronitrile; carboxyl group-containing monomers such as acrylic acid, methacrylic acid, ethacrylic acid, crotonic acid, cinnamic acid, maleic acid, itaconic acid, fumaric acid, citraconic acid, and chloromaleic acid; halogenated vinyl-based monomers such as vinyl chloride; halogenated vinylidene-based monomers such as vinylidene chloride; vinylester-based monomers such as vinyl acetate, vinyl propionate, and vinyl lactate; (meth)acrylic ester-based monomers such as methyl (meth)acrylate, ethyl(meth)acrylate, n-butyl(meth)acrylate, t-butyl(meth)acrylate, 2-ethylhexyl(meth)acrylate, stearyl(meth)acrylate, phenyl(meth) acrylate, isobornyl(meth)acrylate, cyclohexyl(meth) acrylate, benzyl(meth)acrylate, and 2-hydroxyethyl(meth) acrylate; (meth)acrylamide-based monomers such as acrylamide, substituted acrylamide, methacrylamide, and substituted methacrylamide; maleimide-based monomers such as N-phenyl maleimide and N-cyclohexylmaleimide; styrene-based monomers such as styrene and alpha-methylstyrene; ethylenically unsaturated monoolefin-based monomers such as ethylene, propylene, and isobutylene; vinyl ether-based monomers such as vinyl methyl ether, vinyl ethyl ether, and vinyl isobutyl ether; vinyl ketone-based monomers such as vinyl methyl ketone; N-vinyl-based monomers such as N-vinylcarbazole and N-vinylpyrrolidone; and vinylnaphthalene salts. These radical polymerizable monomers may be alone or in combination as the monomer component. Note that, (meth)acryl denotes acryl or methacryl.

The monomer component preferably includes the nitrile-based monomer as an essential component because a shell polymer which forms the outer shells of the hollow particles is excellent in gas barrier property, so that, when the hollow particles are used for the under layer of the thermosensitive recording medium, the hollow fillers can be prevented from crushing upon calendaring, resulting in suppressing reduction in sensitivity. The nitrile-based monomer is preferably acrylonitrile or methacrylonitrile because of availability, high gas barrier property, and high solvent resistance.

When the nitrile-based monomer includes acrylonitrile (AN) and methacrylonitrile (MAN), a mass ratio between acrylonitrile and methacrylonitrile (AN/MAN) is not particularly limited, but preferably 10/90 to 90/10, more preferably 20/80 to 80/20, and further preferably 30/70 to 70/30. When the mass ratio between AN and MAN is less than 10/90, the shell polymer which forms the outer shells of the hollow particles may be deteriorated in the gas barrier property, so that, when the hollow particles are used for the under layer of the thermosensitive recording medium, the hollow fillers may be crushed upon calendaring, resulting in reduction in sensitivity. Meanwhile, when the mass ratio between AN and MAN is more than 90/10, the rate of hollowness may be unsatisfactory, so that, when the hollow particles are used for the under layer of the thermosensitive recording medium, the sensitivity may be reduced due to poor heat insulation property.

The hollow filler preferably includes the nitrile-based monomer in an amount of 80% by mass or greater, more preferably 85% by mass or greater, particularly preferably 90% by mass or greater, and most preferably 95% by mass or greater, relative to the total amount of the thermoplastic resin. When the hollow filler includes the nitrile-based monomer in an amount of 80% by mass or greater relative to the total amount of the thermoplastic resin, the shell polymer which forms the outer shells of the hollow particles is excellent in the gas barrier property, so that, when the hollow particles are used for the under layer of the thermosensitive recording medium, the hollow fillers can be prevented from crushing upon calendaring. Note that, from the viewpoints of achieving both prevention of crushing of the hollow fillers and preciseness of the thermosensitive recording medium, the nitrile-based monomer is preferably included in an amount of 85% by mass or greater but 95% by mass or less.

In addition to the above-listed examples, phenol-formaldehyde resins, urea-formaldehyde resins, melamine-formaldehyde resins, furan resins, and unsaturated polyester resins and cross-linked MMA resins produced through addition polymerization may also be used as the thermoplastic resin.

Components of the outer shells of the hollow fillers may be analyzed by, for example, gas chromatography-mass spectrometry.

A method for producing the hollow fillers is not particularly limited and may be various conventionally known methods. In general, a heat-foaming method in which unfoamed capsular thermally-expandable resin particles, which encapsulate the hydrocarbon as a core material and include the outer shell consisting of the thermoplastic resin, are produced and heated to thereby allow to foam is used. Examples of heat-foaming methods include a dry thermal-expansion method and a wet thermal-expansion method. A temperature at which thermally-expandable resin particles is 60 degrees C. or higher but 350 degrees C. or lower.

—Binding Resin—

The binding resin is not particularly limited and may be appropriately selected according to the intended purpose. Water soluble polymers or aqueous polymer emulsions are preferable.

The water soluble polymers are not particularly limited and may be appropriately selected according to the intended purpose. Examples thereof include polyvinyl alcohols, modified polyvinyl alcohols such as carboxyl group-containing polyvinyl alcohol, starch or starch derivatives, cellulose derivatives such as methoxy cellulose, hydroxyethyl cellulose, calboxymethyl cellulose, methyl cellulose, and ethyl cellulose; polyurethane, sodium polyacrylate, polyvinyl pyrrolidone, acrylamide/acrylic ester copolymers, acrylamide/acrylic ester/methacrylic terpolymers, styrene/maleic anhydride copolymer alkali salts, isobutylene/maleic anhydride copolymer alkali salts, polyacrylamide, sodium alginate, gelatin, and casein. The above-listed examples may be used alone or in combination.

The aqueous polymer emulsions are not particularly limited and may be appropriately selected according to the intended purpose. Examples thereof include acrylic resins, modified acrylic resins such as carboxyl group-containing acrylic resins, latexes of, for example, styrene/butadiene copolymers or styrene/butadiene/acrylic copolymers; and emulsions of, for example, vinyl acetate resins, vinyl acetate/acrylic copolymers, styrene/acrylic ester copolymers, acrylic ester resins, or polyurethane resins. The above-listed examples may be used alone or in combination.

An amount of the binder resin included in the under layer is not particularly limited and may be may be appropriately selected according to the intended purpose. The amount is preferably 30 parts by mass or more but 300 parts by mass or less and more preferably 40 parts by mass or more but 200 parts by mass or less, relative to 100 parts by mass of the hollow fillers.

When the amount is 30 parts by mass or more but 300 parts by mass or less, the support and the under layer sufficiently binds together, leading to good color developability.

—Cross-Linking Agent—

The cross-linking agent is not particularly limited and may be appropriately selected according to the intended purpose. Examples thereof include oxazoline group-containing compounds, glyoxal derivatives, methylol derivatives, epichlorohydrin derivatives, epoxy compounds, aziridine compounds, hydrazine, hydrazide derivatives, and carbodiimide derivatives. The above-listed examples may be used alone or in combination.

—Other Components—

The other components are not particularly limited and may be appropriately selected according to the intended purpose. Examples thereof include surfactants, lubricants, and filling materials.

A method for forming the under layer is not particularly limited and may be appropriately selected according to the intended purpose. For example, the under layer may be formed as follows. The binding resin, the hollow fillers, water, and preferably the cross-linking agent, and optionally the other components are dispersed together with a disperser to thereby prepare a coating liquid for an under layer. Thereafter, the coating liquid for an under layer is applied onto the support and dried.

A method for applying the coating liquid for an under layer is not particularly limited and may be appropriately selected according to the intended purpose. Examples of thereof include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4-roll or 5-roll coating method, a dip coating method, a curtain coating method, a slide coating method, and a die coating method.

A deposition amount of the under layer after drying is not particularly limited and may be appropriately selected depending on the intended purpose. The amount is preferably 1 g/m$^2$ or greater but 5 g/m$^2$ or less and more preferably 1 g/m$^2$ or greater but 3 g/m$^2$ or less.

<Base Material>

The base material is not particularly limited in regard to shape, structure, size, color tone, and material thereof, and may be appropriately selected according to the intended purpose. The shape may be a flat plate-shape or a sheet-like shape. The structure may be monolayer structure or laminated structure. The size may be appropriately selected according to, for example, the size of the thermosensitive recording medium. The base material may be hereinafter referred to as a support.

A material of the support is not particularly limited and may be appropriately selected according to the intended purpose. For example, the material may be inorganic materials or organic materials.

Examples of the inorganic materials include glass, quartz, silicone, silicone oxide, aluminium oxide, $SiO_2$, and metals.

Examples of the organic materials include paper such as pure paper, art paper, coated paper, and synthetic paper; cellulose derivatives such as cellulose triacetate; polyester resins such as polyethylene terephthalate (PET) and polybutylene terephthalate, and plastic films such as polycarbonate, polystyrene, polymethyl methacrylate, polyethylene, and polypropylene. The above-listed examples may be used alone or in combination.

The support is preferably surface-modified by, for example, a corona discharge treatment, an oxidation reaction treatment (e.g., chromic acid), an etching treatment, a treatment for imparting easy adhesiveness, and an antistatic treatment, for the purpose of improving adhesiveness.

An average thickness of the support is not particularly limited and may be appropriately selected according to the intended purpose. The average thickness is preferably 20 micrometers or more but 2,000 micrometers or less and more preferably 50 micrometers or more but 500 micrometers or less.

<Thermosensitive Recording Layer>

The thermosensitive recording layer includes a leuco dye, a color developer, and a binder resin, and, if necessary, further includes other components.

—Leuco Dye—

The leuco dye is not particularly limited and may be appropriately selected according to the intended purpose. Examples thereof include leuco compounds such as triphenylmethane-based dyes, fluoran-based dyes, phenothiazine-based dyes, auramine-based dyes, spiropyran-based dyes, and indolinophthalide-based dyes. The above-listed examples may be used alone or in combination.

Examples of the leuco compounds include
3,3-bis(p-dimethylaminophenyl)-phthalide,
3,3-bis(p-dimethylaminophenyl)-6-dimethylaminophthalide (also known as crystal violet lactone), 3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide, 3-cyclohexylamino-6-chlorofluoran,
3-dimethylamino-5,7-dimethylfluoran, 3-diethylamino-7-chlorofluoran,
3-diethylamino-7-methylfluoran, 3-diethylamino-7,8-benzfluoran,
3-diethylamino-6-methyl-7-chlorofluoran,
3-(N-p-tolyl-N-ethylamino)-6-methyl-7-anilinofluoran,
2-{N-(3'-trifluoromethylphenyl)amino}-6-diethylaminofluoran,
2-{3,6-bis(diethylamino)-9-(o-chloroanilino)xanthyl lactam benzoate},
3-diethylamino-6-methyl-7-(m-trichloromethylanilino)fluoran,
3-diethylamino-7-(o-chloroanilino)fluoran, 3-pyrrolidino-6-methyl-7-anilinofluoran,
3-di-n-butylamino-7-o-chloroanilino)fluoran,
3-N-methyl-N,n-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino) fluoran, benzoyl leuco methylene blue, 6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5' chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methylphenyl)phth alide, 3-(N-ethyl-N-tetrahydrofurfuryl)amino-6-methyl-7-anilinofluoran,
3-N-ethyl-N-(2-ethoxypropyl)amino-6-methyl-7-anilinofluoran,
3-N-methyl-N-isobutyl-6-methyl-7-anilinofluoran,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(alpha-phenylethylamino)fluoran,
3-(N-ethyl-p-toluidino)-7-(alpha-phenylethylamino)fluoran,
3-diethylamino-7-(o-methoxycarbonylphenylamino)fluoran,
3-diethylamino-5-methyl-7-(alpha-phenylethylamino)fluoran,
3-diethylamino-7-piperidinofluoran,
2-chloro-3-(N-methyltoluidino)-7-(p-n-butylanilino)fluoran,
3-di-n-butylamino-6-methyl-7-anilinofluoran,
3,6-bis(dimethylamino)fluorenespiro(9,3')-6'-dimethylaminophthalide,
3-(N-benzyl-N-cyclohexylamino)-5,6-benzo-7-alpha-naphthylamino-4'-bromofluoran,
3-diethylamino-6-chloro-7-anilinofluoran,
3-diethylamino-6-methyl-7-mesitidino-4',5'-benzofluoran,
3-N-methyl-N-isopropyl-6-methyl-7-anilinofluoran,
3-N-ethyl-N-isoamyl-6-methyl-7-anilinofluoran,
3-diethylamino-6-methyl-7-(2',4'-dimethylanilino)fluoran,
3-diethylamino-5-chloro-(alpha-phenylethylamino)fluoran,
3-diethylamino-7-piperidinofluoran,
3-(N-benzyl-N-cyclohexylamino)-5,6-benzo-7-alpha-naphthylamino-4'-bromofluoran,
3-N-ethyl-N-tetrahydrofurfurylamino-6-methyl-7-anilinofluoran,
3-p-dimethylaminophenyl)-3-{1,1-bis(p-dimethylaminophenyl)ethylen-2-yl}phthalide,
3-(p-dimethylaminophenyl)-3-{1,1-bis(p-dimethylaminophenyl)ethylen-2-yl}-6-dimet hylaminophthalide,
3-(p-dimethylaminophenyl)-3-(1-p-dimethylaminophenyl-1-phenylethylen-2-yl)phthali de,
3-(p-dimethylaminophenyl)-3-(1-p-dimethylaminophenyl-1-p-chlorophenylethylen-2-y l)-6-dimethylaminophthalide,
3-(4'-dimethylamino-2'-methoxy)-3-(1"-p-dimethylaminophenyl-1"-p-chlorophenyl-1",
3"-butadien-4"-yl)benzophthalide,
3-(4'-dimethylamino-2'-benzyloxy)-3-(1"-p-dimethylaminophenyl-1"-phenyl-1",3"-buta dien-4"-yl)benzophthalide,
3-dimethylamino-6-dimethylamino-fluorene-9-spiro-3'-(6'-dimethylamino)phthalide,
3,3-bis(2-(p-dimethylaminophenyl)-2-p-methoxyphenyl) ethenyl)-4,5,6,7-tetrachloroph thalide,
3-bis {1,1-bis(4-pyrrolidinophenyl)ethylen-2-yl}-5,6-dichloro-4,7-dibromophthalide, bis(p-dimethylaminostyryl)-1-naphthalenesulfonylmethane, and bis(p-dimethylaminostyryl)-1-p-tolylsulfonylmethane.

A 50% cumulative volume particle diameter ($D_{50}$) of the leuco dye is preferably 0.1 micrometers or greater but 0.5 micrometers or less, and more preferably 0.1 micrometers or greater but 0.4 micrometers or less.

A method for measuring the 50% cumulative volume particle diameter ($D_{50}$) of the leuco dye is not particularly limited and may be appropriately selected according to the intended purpose. For example, a laser diffraction/scattering particle diameter distribution measuring device (device name: LA-920, available from Horiba, Ltd.) may be used.

An amount of the leuco dye is not particularly limited and may be appropriately selected depending on the intended purpose. The amount is preferably 5 parts by mass or greater but 40 parts by mass or less, and more preferably 10 parts by mass or greater but 30 parts by mass or less, relative to 100 parts by mass of a total amount of the thermosensitive recording layer.

—Color Developer—

Various electron-accepting materials which are reacted with the leuco dye upon heating to thereby develop a color may be applied as the color developer.

The color developer is not particularly limited and may be appropriately selected depending on the intended purpose. Examples thereof include phenolic materials, organic acidic materials, inorganic acidic materials, and esters or salts thereof.

Examples thereof include gallic acid, salicylic acid, 3-isopropylsalicylic acid, 3-cyclohexylsalicylic acid, 3,5-di-tert-butylsalicylic acid, 3,5-di-alpha-methylbenzylsalicylic acid, 4,4'-isopropylidenediphenol, 1,1'-isopropylidene bis(2-chlorophenol), 4,4'-isopropylidene bis(2,6-dibromophenol), 4,4'-isopropylidene bis(2,6-dichlorophenol), 4,4'-isopropylidene bis(2-methylphenol), 4,4'-isopropylidene bis(2,6-dimethylphenol), 4,4-isopropylidene bis(2-tert-butylphenol), 4,4'-sec-butylidene diphenol, 4,4'-cyclohexylidene bisphenol, 4,4'-cyclohexylidene bis(2-methylphenol), 4-tert-butylphenol, 4-phenylphenol, 4-hydroxy diphenoxide, alpha-naphthol, beta-naphthol, 3,5-xylenol, thymol, methyl-4-hydroxybenzoate, 4-hydroxyacetophenone, novolac phenolic resins, 2,2'-thiobis(4,6-dichlorophenol), catechol, resorcin, hydroquinone, pyrogallol, phloroglycine, phloroglycine carboxylic acid, 4-tert-octylcatechol, 2,2'-methylenebis(4-chlorophenol), 2,2'-methylenebis(4-methyl-6-tert-butylphenol), 2,2,-dihydroxydiphenyl, 2,4'-dihydroxydiphenylsulfone, 4,4'-[oxybis(ethyleneoxy-P-phenylenesulfonyl)]diphenol, ethyl p-hydroxybenzoate, propyl p-hydroxybenzoate, butyl p-hydroxybenzoate, benzyl p-hydroxybenzoate, p-chlorobenzyl p-hydroxybenzoate, o-chlorobenzyl p-hydroxybenzoate, p-methylbenzyl p-hydroxybenzoate, n-octyl p-hydroxybenzoate, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4-hydroxy-4'-chlorodiphenyl sulfone, bis(4-hydroxyphenyl)sulfide, 2-hydroxy-p-toluic acid, zinc 3,5-di-tert-butyl salicylate, tin 3,5-di-tert-butyl salicylate, tartaric acid, oxalic acid, maleic acid, citric acid, succinic acid, stearic acid, 4-hydroxyphthalic acid, boric acid, thiourea derivative, 4-hydroxythiophenol derivative, bis(4-hydroxyphenyl)acetic acid, ethyl bis(4-hydroxyphenyl)acetate, n-propyl bis(4-hydroxyphenyl)acetate, m-butyl bis(4-hydroxyphenyl)acetate, phenyl bis(4-hydroxyphenyl)acetate, benzyl bis(4-hydroxyphenyl)acetate, phenethyl bis(4-hydroxyphenyl)acetate, bis(3-methyl-4-hydroxyphenyl)acetic acid, methyl bis(3-methyl-4-hydroxyphenyl)acetate, n-propyl bis(3-methyl-4-hydroxyphenyl)acetate, 1,7-bis(4-hydroxyphenylthio) 3,5-dioxaheptane, 1,5-bis(4-hydroxyphenylthio) 3-oxaheptane, dimethyl 4-hydroxyphthalate, 4-hydroxy-4'-methoxydiphenylsulfone, 4-hydroxy-4'-ethoxydiphenylsulfone, 4-hydroxy-4'-isopropoxydiphenylsulfone, 4-hydroxy-4'-propoxydiphenylsulfone, 4,4'-bis(3-(phenoxycarbonylamino)methylphenylureido) diphenylsulfone, 4-hydroxy-4'-butoxydiphenylsulfone, 4-hydroxy-4'-isobutoxydiphenylsulfone, 4-hydroxy-4-butoxydiphenylsulfone, 4-hydroxy-4'-tert-butoxydiphenylsulfone, 4-hydroxy-4'-benzyloxydiphenylsulfone, 4-hydroxy-4'-phenoxydiphenylsulfone, 4-hydroxy-4'-(m-methylbenzyloxy)diphenylsulfone, 4-hydroxy-4'-(p-methylbenzyloxy)diphenylsulfone, 4-hydroxy-4'-(O-methylbenzyloxy)diphenylsulfone, 4-hydroxy-4'-(p-chlorobenzyloxy)diphenylsulfone, N-(2-(3-phenylureide) phenyl)benzene sulfonamide, N-p-toluenesulfonyl-N'-3-(p-toluenesulfonyloxy)phenylurea, N-p-toluenesulfonyl-N'-p-butoxycarbonylphenylurea, N-p-tolylsulfonyl-N'-phenylurea, 4,4'-bis(p-toluenesulfonylaminocarbonylamino)diphenylmethane, and 4,4'-bis[(4-methyl-3-phenoxycarbonylaminophenyl)ureido] diphenylsulfone. The above-listed examples may be used alone or in combination.

A 50% cumulative volume particle diameter ($D_{50}$) of the color developer is preferably 0.1 micrometers or greater but 0.5 micrometers or less, and more preferably 0.1 micrometers or greater but 0.4 micrometers or less.

A method for measuring the 50% cumulative volume particle diameter ($D_{50}$) of the color developer is not particularly limited and may be appropriately selected according to the intended purpose. For example, a laser diffraction/scattering particle diameter distribution measuring device (device name: LA-920, available from Horiba, Ltd.) may be used.

An amount of the color developer is not particularly limited and may be appropriately selected according to the intended purpose. The amount is preferably 0.05 parts by mass or more but 10 parts by mass or less and more preferably 1 part by mass or more but 5 parts by mass or less, relative to 1 part by mass of the leuco dye.

—Binder Resin—

The binder resin is not particularly limited and may be appropriately selected according to the intended purpose. Examples thereof include polyvinyl alcohol resins; starch or starch derivatives; cellulose derivatives such as hydroxymethyl cellulose, hydroxyethyl cellulose, carboxymethyl cellulose, methyl cellulose, and ethyl cellulose; water-soluble polymers such as sodium polyacrylate, polyvinyl pyrrolidone, acrylamide-acrylic ester copolymers, acrylamide-acrylic ester-methacrylic acid terpolymers, styrene-maleic anhydride copolymer alkali salts, isobutylene-maleic anhydride copolymer alkali salts, polyacrylamide, sodium alginate, gelatin, and casein; emulsions of, for example, polyvinyl acetate, polyurethane, polyacrylic acid, polyacrylic ester, vinyl chloride-vinyl acetate copolymers, polybutyl methacrylate, and ethylene-vinyl acetate copolymers; and latexes of, for example, styrene-butadiene copolymers and styrene-butadiene-acrylic copolymers, and styrene/butadiene copolymer latexes. The above-listed examples may be used alone or in combination. Among them, polyvinyl alcohol resins are preferable from the viewpoints of transparency and binding to the base material.

—Other Components—

The other components are not particularly limited and may be appropriately selected according to the intended purpose. Examples thereof include various thermofusible materials serving as sensitivity enhancers, an auxiliary additive, a surfactant, a lubricant, a filling material, an ultraviolet absorbing agent, and a color pigment.

——Thermofusible Material——

Examples of the thermofusible material include fatty acids such as stearic acid and behenic acid; fatty acid amides such as stearic acid amide and palmitic acid amide; fatty acid metal salts such as zinc stearate, aluminum stearate, calcium stearate, zinc palmitate, and zinc behenate; p-benzyl biphenyl, terphenyl, triphenylmethane, benzyl p-benzyloxybenzoate, beta-benzyloxynaphthalene, phenyl beta-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy) biphenyl, p-aryloxybiphenyl, p-propargyloxybiphenyl, dibenzoyloxymethane, dibenzoyloxypropane, dibenzyl disulfide, 1,1-diphenyl ethanol, 1,1-diphenylpropanol, p-benzyloxy benzylalcohol, 1,3-phenoxy-2-propanol, N-octadecylcarbamoyl-p-methoxycarbonyl benzene, N-octadecylcarbamoyl benzene, 1,2-bis(4-methoxyphenoxy)propane, 1,5-bis(4-methoxyphenoxy)-3-oxapentane, dibenzyl oxalate, bis(4-methylbenzyl) oxalate, and bis(4-chlorobenzyl) oxalate. The above-listed examples may be used alone or in combination.

——Auxiliary Additive——

The auxiliary additive is not particularly limited and may be appropriately selected according to the intended purpose. Examples thereof include hindered phenol compounds and hindered amine compounds. The above-listed examples may be used alone or in combination.

Examples of the auxiliary additive include 2,2'-methylenebis(4-ethyl-6-tertiary butylphenol), 4,4'-butylidene bis (6-tertiary butyl-2-methylphenol), 1,1,3-tris(2-methyl-4-hydroxy-5-tertiary butylphenyl)butane, 1,1,3-tris(2-methyl-4-hydroxy-5-cyclohexylphenyl)butane, 4,4'-thiobis(6-tertiary butyl-2-methylphenol), tetrabromo bisphenol A, tetrabromo bisphenol S, 4,4thiobis(2-methylphenol), 4,4'-thiobis(2-chlorophenol), tetrakis(1,2,2,6,6-pentamethyl-4-piperidyl)-1,2,3,4-butane tetracarboxylate, and tetrakis(1,2,2,6,6-tetramethyl-4-piperidyl)-1,2,3,4-butane tetracarboxylate. The above-listed examples may be used alone or in combination.

——Surfactant——

The surfactant is not particularly limited and may be appropriately selected depending on the intended purpose. Examples of the surfactant include anionic surfactants, nonionic surfactants, amphoteric surfactants, and fluorosurfactants. The above-listed examples may be used alone or in combination.

Examples of the anionic surfactants include polyoxyethylene alkyl ether acetate, do-decylbenzene sulfonate, laurate, and polyoxyethylene alkyl ether sulfate salts. The above-listed examples may be used alone or in combination.

Examples of the nonionic surfactants include acetylene glycol-based surfactants, polyoxyethylene alkyl ethers, polyoxyethylene alkyl phenyl ethers, polyoxyethylene alkyl esters, and polyoxyethylene sorbitan fatty acid esters. The above-listed examples may be used alone or in combination.

Examples of the acetylene glycol-based surfactants include 2,4,7,9-tetramethyl-5-decyne-4,7-diol, 3,6-dimethyl-4-octyne-3,6-diol, 3,5-dimethyl-1-hexyne-3-diol, and 2,5,8,11-tetramethyl-6-dodecyne-5,8-diol. The above-listed examples may be used alone or in combination.

——Lubricant——

The lubricant is not particularly limited and may be appropriately selected according to the intended purpose. Examples thereof include higher fatty acids or metal salts thereof, higher fatty acid amides, higher fatty acid esters, animal waxes, vegetable waxes, mineral waxes, and petroleum waxes. The above-listed examples may be used alone or in combination.

——Filling Material——

Examples of the filling material include inorganic powder such as calcium carbonate, silica, zinc oxide, titanium oxide, zirconium oxide, aluminum hydroxide, zinc hydroxide, barium sulfate, clay, kaolin, talc, surface-treated calcium, and surface-treated silica; and organic powder such as urea-formalin resins, styrene-methacrylic acid copolymers, polystyrene resins, and vinylidene chloride resins. The above-listed examples may be used alone or in combination.

An amount of the filling material is not particularly limited and may be appropriately selected depending on the intended purpose. The amount is preferably 0.5 parts by mass or more but 5.0 parts by mass or less and more preferably 1.0 part by mass or more but 4.0 parts by mass or less, relative to 1 part by mass of the binder resin.

——Ultraviolet Absorbing Material——

The ultraviolet absorbing agent is not particularly limited and may be appropriately selected depending on the intended purpose. Examples thereof include salicylic acid-based ultraviolet absorbing agents, benzophenone-based ultraviolet absorbing agents, and benzotriazole-based ultraviolet absorbing agents.

Examples of the ultraviolet absorbing agent include phenyl salicylate, p-tert-butylphenyl salicylate, p-octylphenyl salicylate, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, bis(2-methoxy-4-hydroxy-5-benzoylphenyl)methane, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3',5'-di-tert-butylphenyl)chlorobenzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-{2'-hydroxy-3'-(3",4",5",6"-tetrahydrophthalimidemethyl)-5'-methylphenyl}benzotria zole, 2,2'-methylenebis {4-(1,1,3,3-tetramethylbutyl)-6-(2H-benzotriazol-2-yl)phenol}, 2-(2'-hydroxy-5'-methacryloxyphenyl)-2H-benzotriazole, 2-(3,5-di-t-amyl-2-hydroxyphenyl)benzotriazole, 2-(2'-hydroxy-5'-t-octylphenyl)benzotriazole, and 2-(5-methyl-2-hydroxyphenyl)benzotriazole. The above-listed examples may be used alone or in combination.

——Color Pigment——

The color pigment is not particularly limited and may be appropriately selected according to the intended purpose. Examples thereof include chrome yellow, iron oxide pigments, molybdate orange, cadmium red, zinc sulfide compounds, Hansa yellow, Hansa orange, rose red, pyrazolone red, linoleic red, copper phthalocyanine blue, kopal polybromophthalocyanine blue, indanthrene blue, isodibenzathrene violet, and anthanthrene orange. The above-listed examples may be used alone or in combination.

A method for forming the thermosensitive recording layer is not particularly limited and may be appropriately selected depending on the intended purpose. For example, the thermosensitive recording layer may be formed as follows. The leuco dye and the color developer are pulverized and dispersed together with the binder resin by means of a disperser such as a ball mill, an attritor, and a sand mill, followed by optionally mixing with the other components, to thereby prepare a coating liquid for a thermosensitive recording layer. Thereafter, the coating liquid for a thermosensitive recording layer is applied onto the support and dried.

A method for applying the coating liquid for a thermosensitive recording layer is not particularly limited and may be appropriately selected depending on the intended purpose. Examples thereof include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4-roll or 5-roll coating method, a dip coating method, a curtain coating method, a slide coating method, and a die coating method.

A 50% cumulative volume particle diameter ($D_{50}$) of particles included in the coating liquid for a thermosensitive recording layer is preferably 0.10 micrometers or greater but 3 micrometers or less, more preferably 0.10 micrometers or greater but 0.5 micrometers or less, and particularly preferably 0.10 micrometers or greater but 0.40 micrometers or less.

A deposition amount of the thermosensitive recording layer after drying is not particularly limited and may be appropriately selected depending on the intended purpose. The deposition amount is preferably 1.0 g/m$^2$ or greater but 20.0 g/m$^2$ or less, more preferably 2.0 g/m$^2$ or greater but 10.0 g/m$^2$ or less, and particularly preferably 2.0 g/m$^2$ or greater but 4.0 g/m$^2$ or less.

The thermosensitive recording medium of the present disclosure may include, on one surface of the support, the under layer (heat retention layer) and the thermosensitive recording layer, and, if necessary, further includes a protective layer and other layers.

<Protective Layer>

The protective layer preferably includes a binder and a pigment, more preferably further includes a lubricant and a cross-linking agent, and, if necessary, further include other components.

<<Binder>>

The binder is not particularly limited and may be appropriately selected according to the intended purpose. Examples thereof include water soluble resins, water soluble resin emulsions, hydrophobic resins, ultraviolet curable resins, and e-beam curable resins. The above-listed examples may be used alone or in combination. Among them, water soluble resins are preferable from the viewpoint of head matchability under a low-temperature and low-humidity condition.

Examples of the water soluble resins include polyvinyl alcohols; modified polyvinyl alcohols; cellulose derivatives such as methyl cellulose, methoxy cellulose, and hydroxyl cellulose; casein; gelatin; polyvinylpyrrolidone; styrene/maleic anhydride copolymers; diisobutylene/maleic anhydride copolymers; polyacrylamide; modified polyacrylamide; methyl vinyl ether/maleic anhydride copolymers; carboxyl-modified polyethylene; polyvinyl alcohol/acrylamide block copolymers; melamine-formaldehyde resins; and urea-formaldehyde resins. The above-listed examples may be used alone or in combination. Among them, polyvinyl alcohols are preferable from the viewpoint of plasticizer resistance.

Examples of the water soluble resin emulsions and hydrophobic resins include polyvinyl acetate, polyurethane, styrene/butadiene copolymers, styrene/butadiene/acrylic copolymers, polyacrylic acid, polyacrylic ester, vinyl chloride/vinyl acetate copolymers, polybutyl methacrylate, polyvinyl butyral, polyvinyl acetal, ethyl-cellulose, and ethylene/vinyl acetate copolymers. The above-listed examples may be used alone or in combination.

An average degree of polymerization of the binder is not particularly limited and may be appropriately selected according to the intended purpose. The average degree of polymerization is preferably 1,700 or higher. When the average degree of polymerization of the binder is 1,700 or higher, head matchability under a low-temperature and low-humidity condition and plasticizer resistance can be improved.

Note that, the average degree of polymerization of the binder may be measured by, for example, a test method according to JIS K 6726.

<<Pigment>>

The pigment is not particularly limited and may be appropriately selected according to the intended purpose. Examples thereof includes inorganic powder such as aluminium hydroxide, calcium carbonate, kaolin, silica, zinc oxide, titanium oxide, zinc hydroxide, barium sulfate, clay, talc, surface-treated calcium, and silica; organic powder such as silicone resin particles, urea-formaldehyde resins, styrene/methacrylic copolymers, polystyrene resins, and polymethyl methacrylate resins. The above-listed examples may be used alone or in combination.

An amount of the pigment is preferably 110 parts by mass or more and more preferably 110 parts by mass or more but 200 parts by mass or less, relative to 100 parts by mass of the binder. When the amount of the pigment is 110 parts by mass or more relative to 100 parts by mass of the binder, inorganic particles in an ink-accepting layer can be prevented from transferring to a surface of the protective layer even when the thermosensitive recording medium is stored in a rolled form.

<<Lubricant>>

Lubricant is not particularly limited and may be appropriately selected according to the intended purpose. Examples thereof include polyethylene oxide waxes, montan waxes, zinc stearate, and silicone waxes. The above-listed examples may be used alone or in combination.

The lubricant may be used in combination with other known lubricants, if necessary. Examples of the other lubricants include vegetable waxes such as candelilla wax, carnauba wax, rice wax, Japanese wax, and jojoba oil; animal waxes such as beeswax, lanolin, and spermaceti wax; mineral waxes such as ceresin and derivatives thereof; petroleum waxes such as paraffin, vaseline, microcrystalline, and petrolatum; synthetic hydrocarbon-based waxes such as Fischer-Tropsch wax; hydrogenated waxes such as hydrogenated castor oil and hydrogenated castor oil derivatives; fatty acids such as stearic acid, oleic acid, erucic acid, lauric acid, sebacic acid, behenic acid, and palmitic acid; amides such as adipic acid and isophthalic acid; bisamides, esters, ketones, metal salts and derivatives thereof; and alkyl-modified silicone resins or amide-modified silicone resins. The above-listed examples may be used alone or in combination.

<<Cross-Linking Agent>>

The cross-linking agent is not particularly limited and may be appropriately selected according to the intended purpose. Examples of water resistant agents for the water soluble resins include polyamide epichlorohydrin resins and adipic dihydrazide. The above-listed examples may be used alone or in combination.

A method for forming the protective layer is not particularly limited and may be well-known methods. For example, the pigment and the cross-linking agent are separately pulverized and dispersed each together with the binder and the other components by means of a disperser, such as a ball mill, an attritor, and a sand mill until a dispersed particle diameter is 0.1 micrometers or more but 3 micrometers or less, followed by mixing together at a constant formulation optionally with the lubricant, to thereby prepare a coating liquid for a protective layer. Thereafter, the coating liquid for a protective layer is applied onto the thermosensitive recording layer, to thereby form the protective layer.

An applied amount of the coating liquid for a protective layer is preferably 0.1 g/m$^2$ or more but 20 g/m$^2$ or less and more preferably 0.5 g/m$^2$ or more but 10 g/m$^2$ or less on a dry weight basis. When the applied amount of the coating liquid for a protective layer is 0.1 g/m$^2$ or more but 20 g/m$^2$ or less, head matchability under a low-temperature and low-humidity condition and plasticizer resistance can be improved.

<Other Layers>

Other layers are not particularly limited and may be appropriately selected according to the intended purpose. Examples thereof include a backcoat layer and a releasing layer. Note that, the releasing layer may be hereinafter referred to as a mold-releasing layer.

<<Backcoat Layer>>

The backcoat layer may be optionally disposed on a surface of the support on a side on which the thermosensitive recording layer is not disposed.

The backcoat layer includes a filler and a binding resin and, if necessary, further includes other components such as a lubricant and a coloring pigment.

The filler may be inorganic fillers or organic fillers.

Examples of the inorganic fillers include carbonates, silicates, metal oxides, and sulfuric acid compounds.

Examples of the organic fillers include silicone resins, cellulose, epoxy resins, nylon resins, phenolic resins, polyurethane resins, urea resins, melamine resins, polyester resins, polycarbonate resins, styrene resins, acrylic resins, polyethylene resins, formaldehyde resins, and polymethyl methacrylate resins.

The binding resin is not particularly limited and may be appropriately selected depending on the intended purpose. For example the binding resin may be the same as the binding resin in the thermosensitive recording layer.

An average thickness of the backcoat layer is not particularly limited and may be appropriately selected depending on the intended purpose. The average thickness is preferably 0.1 micrometers or greater but 20 micrometers or less and more preferably 0.3 micrometers or greater but 10 micrometers or less.

<<Releasing Layer>>

The releasing layer may be disposed onto an outermost layer of a surface on which the thermosensitive recording layer is disposed, in the case of linerless thermosensitive recording media. Examples of a releasing agent used in the releasing layer include ultraviolet curable silicone resins, thermosetting silicone resins, and fluorine-based releasing agents. The above-listed examples may be used alone or in combination. Among them, preferable are the ultraviolet curable silicone resins from the viewpoints of high curing speed and excellent release stability over time.

Examples of the ultraviolet curable silicone resins include silicone resins to be cured through cationic polymerization and silicone resins to be cured through radical polymerization. The silicone resins to be cured through radical polymerization may undergo a severe volume shrinkage upon curing, potentially allowing the support to curl.

A deposition amount of the releasing layer after drying is preferably 0.2 g/$m^2$ or greater but 2.0 g/$m^2$ or less. When the deposition amount of the releasing layer after drying is in the range of 0.2 g/$m^2$ or greater but 2.0 g/$m^2$ or less, proper releasing force is obtained and paper jam during paper conveyance in a printer can be reduced.

<<Tackifier Layer>>

The tackifier layer includes a tackifier and, if necessary, further includes other components.

A material of the tackifier layer is not particularly limited and may be appropriately selected depending on the intended purpose. Examples of the material include urea resins, melamine resins, phenolic resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic ester copolymers, methacrylic ester copolymers, natural rubber, cyanoacrylate resins, and silicone resins. The above-listed examples may be used alone or in combination.

—Other Components—

The other components are not particularly limited and may be appropriately selected according to the intended purpose. The same components as those applicable to the tackifier layer may be used.

An aspect of the thermosensitive recording medium of the present disclosure is not particularly limited and may be appropriately selected depending on the intended purpose. For example, the thermosensitive recording medium may be used as is as a label, or may include, on the protective layer or the support, a layer on which in-formation such as characters, marks, pictures, and two-dimensional codes such as barcodes or QR codes (registered trademark) is recorded.

An aspect of the thermosensitive recording media of the present disclosure is not particularly limited and may be appropriately selected depending on the intended purpose. For example, the thermosensitive recording medium of which a tackifier layer is laminated with a piece of releasing paper may be used as a sticker-type thermosensitive recording medium or a thermosensitive recording label.

The releasing paper is not particularly limited and may be appropriately selected depending on the intended purpose. Examples thereof include those in which, for example, neutral paper, acid paper, or plastics are laminated together. Moreover, stereotyped illustrations such as colored logos or fixed phrases may be printed by printing methods such as inkjet printing or offset printing over a side of a base material opposite to the side on which the thermosensitive recording layer is formed.

A shape of the thermosensitive recording medium of the present disclosure is not particularly limited and may be appropriately selected depending on the intended purpose. The shape of the thermosensitive recording medium may be a label-like shape, a sheet-like shape, or a roll-like shape. Moreover, the thermosensitive recording medium may be a linerless-type thermosensitive recording medium including the releasing layer on a base material and being wound up in a roll-like shape.

The thermosensitive recording medium of the present disclosure may have a perforated line for the purpose of preventing re-sticking. This perforated line reduces paper strength at a site of the perforated line, so that a label (the thermosensitive recording medium with the tackifier) itself is more easily teared up when the label is peeled off from an adherend. A shape of the perforated line is not particularly limited and may be appropriately selected depending on the intended purpose.

The perforated line needs to include uncut portions each having a length of 1.5 mm or shorter and cut portions each having a length equal to or more than twice the length of the uncut portion. Further preferably, the length of each of the cut portions is preferably from 3 through 10 times as long as that of the uncut portion.

A structure of the linerless-type thermosensitive recording medium is not particularly limited and may be appropriately selected depending on the intended purpose. The structure of the thermosensitive recording medium may be a label-like structure, a sheet-like structure, or a roll-like structure. Among them, the roll-like structure is preferable from the viewpoint of convenience.

The thermosensitive recording medium of the present disclosure preferably has the Oken smoothness on a thermosensitive recording layer-side surface of 1,000 s or more, more preferably 1,000 s or more but 20,000 s or less.

The "thermosensitive recording layer-side surface" denotes a surface of an outermost surface layer of a base material on a side on which a thermosensitive recording layer is formed.

When the Oken smoothness on the thermosensitive recording layer-side surface is 1,000 s or more, printing preciseness can be improved.

The Oken smoothness may be measured according to JIS P 8155.

Figure 1B:
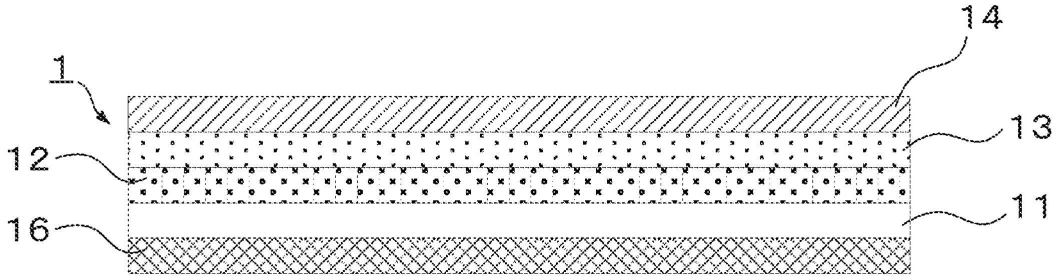
FIG. 1B is a schematic diagram illustrating another example of a thermosensitive recording medium of the present disclosure.

FIG. 1A is a diagram illustrating an example of a thermosensitive recording medium of the present disclosure. As illustrated in FIG. 1A, the thermosensitive recording medium 1 of the present disclosure includes a base material 11, an under layer 12 on the base material, and a thermosensitive recording layer 13 on the under layer. FIG. 1A illustrates an aspect in which a protective layer 14 is formed on the thermosensitive recording layer 13. As illustrated in FIG. 1B, a tackifier layer 16 may be disposed on a surface of the base material 11 opposite to the thermosensitive recording layer 13.

(Method for Producing Thermosensitive Recording Medium)

A method for producing a thermosensitive recording medium of the present disclosure includes a step of forming, on a base material, an under layer including hollow fillers and a hydrocarbon; and a step of forming a thermosensitive recording layer on the under layer; and, if necessary, further includes other steps.

<Step of Forming Under Layer>

The Step of Forming an Under Layer is not Particularly Limited and May be Appropriately selected according to the intended purpose. The under layer may be produced using the same method as the above-described method for forming the under layer in the thermosensitive recording medium of the present disclosure. Note that, the same hollow fillers and hydrocarbon as those in the thermosensitive recording medium of the present disclosure may be used in the method for producing a thermosensitive recording medium. Therefore, descriptions in regard to the hollow fillers and the hydrocarbon are omitted.

<Step of forming thermosensitive recording layer>

The step of forming a thermosensitive recording layer is not particularly limited and may be appropriately selected depending on the intended purpose. The same step as that in the above-described method for forming the thermosensitive recording layer may be used.

Note that, a surface of the base material on which the thermosensitive recording layer is formed is preferably subjected to surface modification treatment such as a corona discharge treatment, an oxidation reaction treatment (e.g., chromic acid), an etching treatment, a treatment for imparting easy adhesiveness, and an antistatic treatment before applying a coating liquid for a thermosensitive recording layer thereonto. This makes it possible to improve adhesiveness between the base material and the thermosensitive recording layer. In addition to the surface modification treatment, for the purpose of preventing the layer from peeling, for example, a layer (easily adhesive layer) including a styrene-butadiene polymer may be formed on the base material, and then the thermosensitive recording layer may be formed on the layer including the styrene-butadiene polymer.

<Other Steps>

The other steps may include a step of forming a tackifier layer and a step of forming a protective layer. In the case of producing a sticker-type thermosensitive recording medium, releasing paper is preferably laminated onto the tackifier layer. The method for laminating the releasing paper is not particularly limited, and may be a method used for general purposes.

In the case of producing a linerless-type thermosensitive recording medium, a coating liquid for a mold-releasing layer is applied on a side of the base material opposite to the side on which the thermosensitive recording layer is formed. A method for applying the coating liquid for a mold-releasing layer may be the same method as the above-described method for applying the coating liquid for a thermosensitive recording layer.

<Step of Forming Tackifier Layer>

The step of forming a tackifier layer may be conventionally used forming methods. For example, the tackifier layer may be formed by applying a tackifier on the support by means of a coating method such as a bar coating method, a roll coating method, a comma coating method, and a gravure coating method, and then drying the tackifier.

<Calendaring Step>

A step of smoothing a surface through calendaring is not particularly limited and may be appropriately selected according to the intended purpose. Examples thereof include super calendaring, gloss calendaring, and machine calendaring. A pressure at which calendaring is performed is not particularly limited and may be appropriately selected according to the intended purpose. The pressure is preferably 10 kg/cm$^2$ or more but 50 kg/cm$^2$ or less.

(Recording Method)

A recording method using the thermosensitive recording medium of the present disclosure is not particularly limited and may be appropriately selected depending on the intended purpose. For example, a thermal head or a laser may be used.

The thermal head is not particularly limited in regard to shape, structure, and size, and may be appropriately selected depending on the intended purpose.

The laser is not particularly limited and may be appropriately selected depending on the intended purpose. Examples of thereof include a $CO_2$ laser and a semiconductor laser having a wavelength of from 9.3 micrometers or longer but 10.6 micrometers or shorter.

(Applications)

The thermosensitive recording medium of the present disclosure has high color developing sensitivity, high image density, and excellent hand cream resistance. Therefore, the thermosensitive recording medium can be used in many fields such as the field of POS for, for example, perishable foods, box lunches, and delicatessen; the field of copying of, for example, books and documents; the field of communication, for example, facsimile; the field of ticketing, for example, ticketing machines, receipts and signed receipts; baggage tags in the airline industry; and pill cases and pill bottles.

(Article)

An article includes the thermosensitive recording medium of the present disclosure.

The thermosensitive recording medium of the present disclosure can be suitably used as the thermosensitive recording medium.

The article including the thermosensitive recording medium of the present disclosure refers to an article on which the thermosensitive recording medium of the present disclosure is, for example, pasted or attached.

The article of the present disclosure is not particularly limited as long as the article includes the thermosensitive recording medium of the present disclosure and may be appropriately selected depending on the intended purpose. Examples of the article include packing materials, packaging materials, and wrapping paper, and especially, articles that needs to have high solvent resistance.

EXAMPLES

The present disclosure will now be described by way of Examples. The present disclosure should not be in any way limited to these Examples.

Production Example 1

—Production of Hollow Fillers—

——Production of Hollow Filler A——

To 500 g of ion-exchanged water, were added 100 g of colloidal silica (effective concentration: 20% by mass) and 3.0 g of adipic acid-diethanolamine condensate. Then, the resultant mixture is adjusted to pH 3.0 to 4.0 to thereby prepare an aqueous dispersion medium.

Separately, monomer components (48 g of acrylonitrile, 112 g of methacrylonitrile, and 40 g of methyl acrylate), a cross-linking agent (2.0 g of ethyleneglycol dimethacrylate), a foaming agent (60 g of isobutene), and a polymerization initiator (2.0 g of azobisisobutyronitrile) were mixed together to thereby prepare an oily mixture.

The aqueous dispersion medium and the oily mixture were mixed together. The resultant mixed liquid was dispersed by a homomixer at 12,000 rpm for 5 min to thereby prepare a suspension liquid. The suspension liquid was transferred to a 1.5 liter pressure reactor, which was purged with nitrogen and then adjusted to an initial reaction pressure of 0.2 MPa. The suspension liquid was allowed to polymerize at a polymerization temperature of 60 degrees C. for 15 hours with stirring at 80 rpm to thereby obtain capsular thermally-expandable resin particles. The resultant thermally-expandable resin particles were heated at a foaming temperature controlled in the range of from 100 degrees C. through 140 degrees C. to achieve the desired rate of hollowness and then dehydrated by a centrifugal dehydrator, according to the wet heat-expansion method described in Japanese Unexamined Patent Application Publication No. 62-201231. Thus, hollow filler which is less expanded than existing fillers (non-thermally-expandable hollow) A was produced. Note that, the hollow filler A had a solid concentration of 33% by mass.

Production Examples 2 to 9

—Production of Hollow Fillers B to I—

Hollow fillers B to I were produced in the same manner as in Production Example 1, except that components of the aqueous dispersion medium and the oily mixture in Production Example 1 and amounts thereof were changed to those described in Tables 1 and 2. Note that, each of the hollow fillers was adjusted to have a solid concentration of 33% by mass. Note that, numerical values in Tables 1 and 2 are described in part(s) by mass.

TABLE 1

| | | Production Example 1 | Production Example 2 | Production Example 3 | Production Example 4 | Production Example 5 | Production Example 6 |
|---|---|---|---|---|---|---|---|
| Hollow filler type | | A | B | C | D | E | F |
| Aqueous dispersion liquid | Ion-exchanged water | 500 | 500 | 500 | 500 | 500 | 500 |
| | NaCl | 0 | 100 | 0 | 100 | 0 | 100 |
| | Colloidal silica (Effective concentration 20 wt %) | 100 | 95 | 85 | 80 | 75 | 65 |
| | Adipic acid-diethanolamine condensate | 3 | 3 | 3 | 3 | 3 | 3 |
| Monomer component | AN | 48 | 144 | 102 | 54 | 124 | 180 |
| | MAN | 112 | 16 | 68 | 126 | 67 | 20 |
| | MA | 40 | 0 | 0 | 0 | 0 | 0 |
| | MMA | 0 | 20 | 30 | 10 | 0 | 0 |
| | IBX | 0 | 20 | 0 | 10 | 10 | 0 |
| Cross-linking agent | EDMA | 2 | 8 | 6 | 1 | 2 | 4 |
| Polymerization initiator | AIBN | 1.5 | 2 | 0 | 2.5 | 0 | 0 |
| | OPP | 0 | 0 | 3 | 0 | 2 | 1.5 |
| Hydrocarbon to be vaporized upon heating | Isobutane | 60 | 55 | 50 | 45 | 40 | 20 |
| | Isopentane | 0 | 0 | 0 | 0 | 20 | 40 |
| | Normal pentane | 0 | 0 | 0 | 0 | 0 | 0 |
| | Isohexane | 0 | 0 | 0 | 15 | 0 | 0 |
| | Isooctane | 0 | 0 | 10 | 0 | 0 | 0 |
| | Isododecane | 0 | 5 | 0 | 0 | 0 | 0 |

TABLE 2

| | | Production Example 7 | Production Example 8 | Production Example 9 |
|---|---|---|---|---|
| Hollow filler type | | G | H | I |
| Aqueous disperson liquid | Ion-exchanged water | 500 | 500 | 500 |
| | NaCl | 100 | 0 | 0 |
| | Colloidal silica (Effective concentration 20 wt %) | 80 | 100 | 100 |
| | Adipic acid-diethanoiamine condensate | 3 | 3 | 3 |

TABLE 2-continued

| Hollow filler type | | Production Example 7 G | Production Example 8 H | Production Example 9 I |
|---|---|---|---|---|
| Monomer component | AN | 113 | 0 | 171 |
| | MAN | 38 | 170 | 9 |
| | MA | 0 | 0 | 0 |
| | MMA | 50 | 30 | 0 |
| | IBX | 0 | 0 | 20 |
| Cross-linking agent | EDMA | 2 | 2 | 2 |
| Polymerization initiator | AIBN | 1.5 | 1.5 | 1.5 |
| | OPP | 0 | 0 | 0 |
| Hydrocarbon to be vaporized upon heating | Isobutane | 30 | 30 | 30 |
| | Isopentane | 30 | 30 | 30 |
| | Normal pentane | 0 | 0 | 0 |
| | Isohexane | 0 | 0 | 0 |
| | Isooctane | 0 | 0 | 0 |
| | Isododecane | 0 | 0 | 0 |

In Tables 1 and 2, the monomer components, the initiators, and the cross-linking agent are abbreviated as follows.

AN: acrylonitrile

MAN: methacrylonitrile

MA: methyl acrylate

MMA: methyl methacrylate

IBX: isobornyl methacrylate

EDMA: ethyleneglycol dimethacrylate

AIBN: azobisisobutyronitrile

OPP: di-2-ethylhexylperoxydicarbonate

Production Example 10

—Production of Thermally-Expandable Resin Particles—

Capsular thermally-expandable resin particles were obtained in the same manner as in Production Example 1, except that the resultant capsular thermally-expandable resin particles were not heated or dehydrated.

Example 1

—Preparation of Liquid for Forming Under Layer 1—

Hollow filler A produced above (solid concentration: 33% by mass): 20 parts by mass Styrene/butadiene copolymer latex (solid concentration: 47.5% by mass): 20 parts by mass 10% by mass aqueous polyvinyl alcohol solution (PVA117, available from Kuraray Co., Ltd.): 20 parts by mass Ion-exchanged water: 40 parts by mass These were mixed and stirred to thereby prepare a liquid for forming an under layer 1.

—Preparation of Liquid for Forming Thermosensitive Recording Layer—

<Dye Dispersion Liquid>

Leuco dye (3-dibutylamino-6-methyl-7-anilinofluoran): 20 parts by mass

10% by mass aqueous itaconic acid-modified polyvinyl alcohol solution (25-88KL, available from Kuraray Co., Ltd.): 40 parts by mass Surfactant (NEWCOL 290, available from NIPPON NYUKAZAI CO., LTD., solid concentration: 100% by mass): 0.2 parts by mass Ion-exchanged water: 40 parts by mass These were mixed together and dispersed by a sand grinder to have a 50% cumulative volume particle diameter ($D_{50}$) of 0.5 micrometers. Thus, a dye dispersion liquid was prepared.

<Color Developer Dispersion Liquid>

4-hydroxy-4'-isopropoxydiphenylsulphone: 20 parts by mass

10% by mass aqueous itaconic acid-modified polyvinyl alcohol solution (25-88KL, available from Kuraray Co., Ltd.): 20 parts by mass Amorphous silica (MIZUKASIL P527, available from MIZUSAWA INDUSTRIAL CHEMICALS, LTD.): 15 parts by mass Surfactant (PD-001, available from Nissin Chemical Industry Co., Ltd., solid concentration: 100% by mass): 0.2 parts by mass Ion-exchanged water: 60 parts by mass These were mixed together and dispersed by a sand grinder to have a 50% cumulative volume particle diameter ($D_{50}$) of 1.0 micrometer. Thus, a dye dispersion liquid was prepared.

Then, 20 parts by mass of the dye dispersion liquid, 40 parts by mass of the color developer dispersion liquid, 5 parts by mass of the styrene-butadiene copolymer latex (solid concentration: 47.5% by mass), 10 parts by mass of a 10% by mass aqueous itaconic acid-modified polyvinyl alcohol solution, and 40 parts by mass of ion-exchanged water were mixed and stirred to thereby prepare a liquid for forming an thermosensitive recording layer.

<Filling Material Dispersion Liquid>

Aluminium hydroxide: 30 parts by mass

10% by mass aqueous itaconic acid-modified polyvinyl alcohol solution (25-88KL, available from Kuraray Co., Ltd.): 30 parts by mass Ion-exchanged water: 40 parts by mass These were mixed together and dispersed by a sand grinder to have a volume average particle diameter of 0.5 micrometers. Thus, a filling material dispersion liquid was prepared.

—Preparation of Liquid for Forming Protective Layer—

The above filling material dispersion liquid: 30 parts by mass

10% by mass aqueous diacetone-modified polyvinyl alcohol solution (DF-17, available from JAPAN VAM & POVAL CO., LTD.): 50 parts by mass Cross-linking agent liquid (adipic dihydrazide, solid concentration: 10% by mass): 20 parts by mass Montanic ester wax dispersion liquid (solid concentration: 30% by mass): 5 parts by mass Ion-exchanged water: 15 parts by mass These were mixed and stirred to thereby prepare a liquid for forming a protective layer.

Then, a surface of a piece of paper having a basis weight of 62 $g/m^2$ as a base material was coated with the liquid for forming an under layer 1 so as to have a dry deposition amount of 1.5 $g/m^2$. Then, the liquid for forming a thermosensitive recording layer was applied thereon so as to have the dry deposition amount of 3.0 $g/m^2$ and dried. Moreover, the liquid for forming a protective layer was applied thereon so as to have the dry deposition amount of 2.0 $g/m^2$ and dried. Thereafter, the resultant was subjected to a surface treatment with super calendaring so that the protective layer had the Oken smoothness of 2,000 s. Thus, a thermosensitive recording medium 1 was obtained.

Example 2

A thermosensitive recording medium 2 was obtained in the same manner as in Example 1, except that the hollow filler A used for the underlayer was changed to the hollow filler B.

Example 3

A thermosensitive recording medium 3 was obtained in the same manner as in Example 1, except that the hollow filler A used for the under layer was changed to the hollow filler C.

Example 4

A thermosensitive recording medium 4 was obtained in the same manner as in Example 1, except that the hollow filler A used for the under layer was changed to the hollow filler D.

Example 5

A thermosensitive recording medium 5 was obtained in the same manner as in Example 1, except that the hollow filler A used for the under layer was changed to the hollow filler E.

Example 6

A thermosensitive recording medium 6 was obtained in the same manner as in Example 5, except that the calendaring condition was adjusted so that the smoothness was 1,000 s.

Example 7

A thermosensitive recording medium 7 was obtained in the same manner as in Example 1, except that the hollow filler A used for the under layer was changed to the hollow filler F.

Comparative Example 1

A thermosensitive recording medium 8 was obtained in the same manner as in Example 1, except that the hollow filler A used for the under layer was changed to the hollow filler G.

Comparative Example 2

A thermosensitive recording medium 9 was obtained in the same manner as in Example 1, except that the hollow filler A used for the under layer was changed to the hollow filler H.

Comparative Example 3

A thermosensitive recording medium 10 was obtained in the same manner as in Example 1, except that the hollow filler A used for the under layer was changed to the hollow filler I.

Comparative Example 4

A thermosensitive recording medium 11 was obtained in the same manner as in Example 1, except that the hollow filler A used for the under layer was changed to the thermally-expandable resin particles produced in Production Example 10.

Comparative Example 5

A thermosensitive recording medium 12 was obtained in the same manner as in Example 1, except that the hollow filler A used for the under layer was changed to 25 parts by mass of hollow fillers each having the rate of hollowness of 50% and the average particle diameter of 1.0 micrometer (HP-1055, available from The Dow Chemical Company, solid concentration: 26.5% by mass).

Then, the thermosensitive recording media of Examples and Comparative Examples were used to measure an "amount of a hydrocarbon in a thermosensitive recording medium" and the "Oken smoothness" as follows. Results are presented in Table 3 below. Moreover, "sensitivity" and "preciseness" were evaluated as follows. Results are presented in Table 4 below.

(Amount of Hydrocarbon in Thermosensitive Recording Medium)

A weight of a hydrocarbon included in the thermosensitive recording medium was measured by a headspace gas chromatographic method as follows.

First, 2.5 $cm^2$ of the thermosensitive recording medium was weighed into a 20 mL headspace vial. This vial was sealed hermetically with a fluororesin-covered silicone gum septum and an aluminium cap. The thus-sealed headspace vial was heated at 170 degrees C. for 20 min and then pressured with helium for 0.5 min. Thereafter, 3 mL of a gas phase (headspace) was taken and introduced into a gas chromatograph to thereby measure a proportion by weight of the hydrocarbon in the thermosensitive recording medium.

Conditions under which the headspace gas chromatographic analysis was performed were as follows.

GC column: DB-624, available from Agilent Technologies, length: 30 m, inner diameter: 0.25 mm, film thickness: 1.40 micrometers)

Detector: FID, temperature: 200 degrees C.

Heating program: 40 degrees C. (6 min)→20 degrees C./min→200 degrees C. (hold for 3 min)

Inlet temperature: 200 degrees C.

Gas introduction amount: 3 mL

Helium flow rate: 1 mL/min

Split ratio: 10:1

Quantification: calibration-curve method (5 microliters of a solution in which a known amount of a sample was dissolved in DMF was taken into a 20 mL headspace vial. This vial was sealed hermetically with a fluororesin-covered silicone gum septum and an aluminium cap. The thus-sealed headspace vial was heated at 170 degrees C. for 20 min and pressured with helium for 0.5 min. Thereafter, 3 mL of a gas phase (headspace) was taken and introduced into a gas chromatograph.)

The calculated value of the amount was multiplied by 4000 to thereby determine the amount of the hydrocarbon per 1 $m^2$ of the thermosensitive recording medium.

(Oken Smoothness)

The Oken smoothness was measured according to JIS P 8155.

(Sensitivity)

Recording was performed on the thermosensitive recording medium by means of a recording simulator (available from Ohkura Electric Co., Ltd.) with a pulse width of from 0.2 ms through 1.2 ms under the following conditions: head power of 0.45 w/dot, 1-line recording time of 20 ms/line, and scanning line density of 8×3.85 dot/mm. Print density was measured with a Macbeth reflection densitometer (RD-914, available from Gretag Macbeth Ltd.). A pulse width needed to obtain an image density of 1.0 was calculated. Based on the pulse width, a sensitivity magnification relative to Comparative Example 1 was calculated according to the mathematical expression described below. The sensitivity magnification was evaluated according to the criteria below.

Sensitivity magnification=(Pulse width for Comparative Example 1)/(Pulse width for measured sample)

Evaluation criteria

A: The sensitivity magnification was 1.11 or greater.

B: The sensitivity magnification was 1.01 or greater but 1.10 or less.

C: The sensitivity magnification was 1.00 or less.

(Preciseness)

Any characters and images were printed on each thermosensitive recording material (thermosensitive recording material with no printed section) by means of the thermal label printer (1-4308, available from DATAMAX) with a printing speed of 8 ips and a printing density of 0.80. Thus-printed images were visually observed and evaluated according to the criteria below.

Evaluation criteria

A: Characters or images had no void.

B: Characters or images had some voids but were able to be recognized.

C: Characters or images had voids and were not able to be recognized.

(Comprehensive evaluation)

The worst evaluation result in each of Examples was presented as the result of a comprehensive evaluation.

TABLE 3

| | Hollow filler | | | | | | | | |
|---|---|---|---|---|---|---|---|---|---|
| | Name | Hydrocarbon to be vaporized upon heating | Boiling point (° C.) | Percent of nitrile-based monomer in monomer components (%) | Volume average particle diameter (μm) | Rate of hollowness (%) | Amount of hydrocarbon (mg/m$^2$) | Amount of hydrocarbon relative to mass of Hollow filler (% by mass) | Oken smoothness (s) |
| Ex. 1 | Hollow filler A | Isobutane | −12 | 80 | 2.0 | 72 | 0.24 | 0.20 | 2,000 |
| Ex. 2 | Hollow filler B | Isobutane<br>Isododecane | −12<br>177 | 80 | 3.0 | 90 | 0.85 | 0.79 | 2,000 |
| Ex. 3 | Hollow filler C | Isobutane<br>Isooctane | −12<br>99 | 85 | 3.5 | 88 | 4.2 | 4.1 | 2,000 |
| Ex. 4 | Hollow filler D | Isobutane<br>Isohexane | −12<br>49-63 | 90 | 5.5 | 75 | 3.5 | 3.5 | 2,000 |
| Ex. 5 | Hollow filler E | Isobutane<br>Isopentane | −12<br>28 | 95 | 4.8 | 90 | 8.4 | 8.3 | 2,000 |
| Ex. 6 | Hollow filler E | Isobutane<br>lsopentane | −12<br>28 | 95 | 4.8 | 90 | 8.4 | 8.3 | 1,000 |
| Ex. 7 | Hollow filler F | Isobutane<br>lsopentane | −12<br>28 | 100 | 8.0 | 95 | 14.9 | 14.9 | 2,000 |
| Comp. Ex. 1 | Hollow filler G | Isobutane<br>Isopentane | −12<br>28 | 75 | 5.0 | 90 | 0.09 | 0 | 2,000 |
| Comp. Ex. 2 | Hollow filler H | Isobutane<br>Isopentane | −12<br>28 | 85 | 2.5 | 78 | 0.08 | 0 | 2,000 |
| Comp. Ex. 3 | Hollow filler I | Isobutane<br>Isopentane | −12<br>28 | 90 | 2.5 | 0 | 0.07 | 0 | 2,000 |
| Comp. Ex. 4 | Thermally-expandable resin particles | Isobutane | −12 | 80 | — | — | 15 | 15 | 2,000 |
| Comp. Ex. 5 | HP-1055 | — | — | — | 2.5 | 50 | 0.09 | 0 | 2,000 |

TABLE 4

| | Sensitivity | | | |
|---|---|---|---|---|
| | Sensitivity magnification | Evaluation | Preciseness Evaluation | Comprehensive evaluation |
| Ex. 1 | 1.06 | B | A | B |
| Ex. 2 | 1.10 | B | A | B |
| Ex. 3 | 1.15 | A | A | A |
| Ex. 4 | 1.14 | A | A | A |
| Ex. 5 | 1.19 | A | A | A |

TABLE 4-continued

| | Sensitivity | | | |
|---|---|---|---|---|
| | Sensitivity magnification | Evaluation | Preciseness Evaluation | Comprehensive evaluation |
| Ex. 6 | 1.20 | A | B | B |
| Ex. 7 | 1.12 | A | B | B |
| Comp. Ex. 1 | 1.00 | C | B | C |
| Comp. Ex. 2 | 0.94 | C | B | C |
| Comp. Ex. 3 | 0.90 | C | C | |
| Comp. Ex. 4 | 0.90 | C | C | C |
| Comp. Ex. 5 | 0.95 | C | C | C |

Figure 2A:
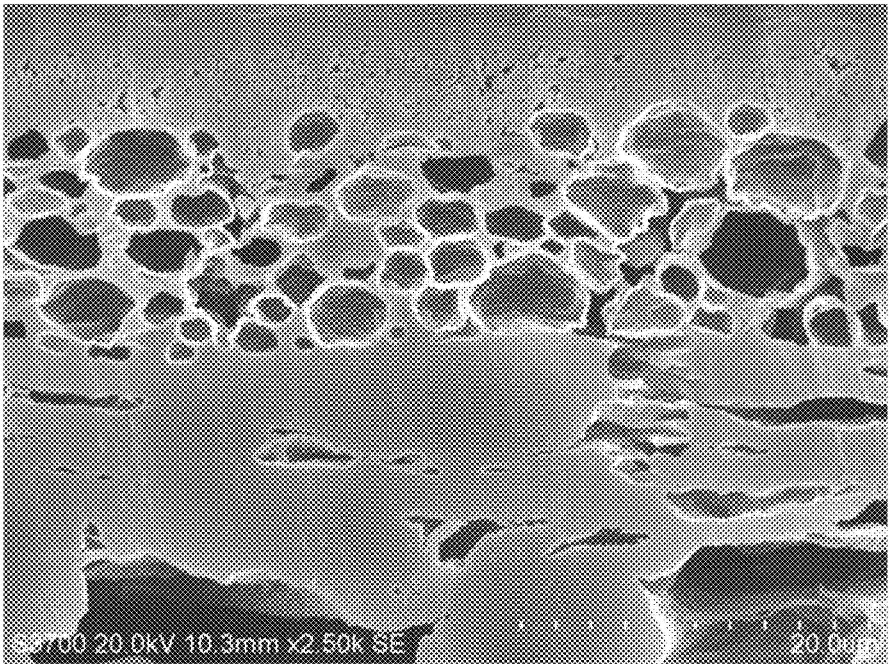
FIG. 2A is an example of a scanning microscopic image illustrating a cross-section of the thermosensitive recording medium of Example 5.
Figure 2B:
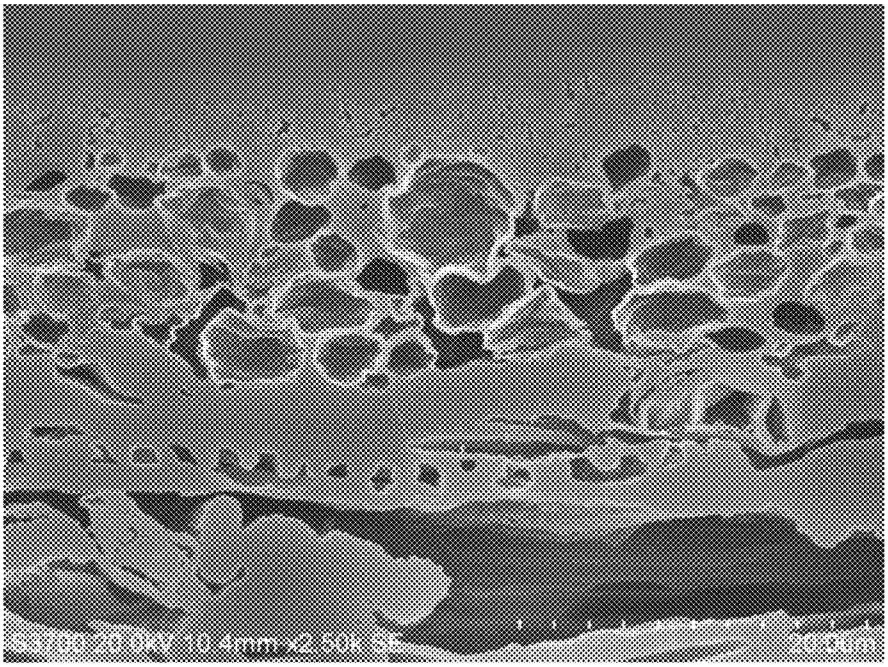
FIG. 2B is another example of a scanning microscopic image illustrating a cross-section of the thermosensitive recording medium of Example 5.
Figure 3A:
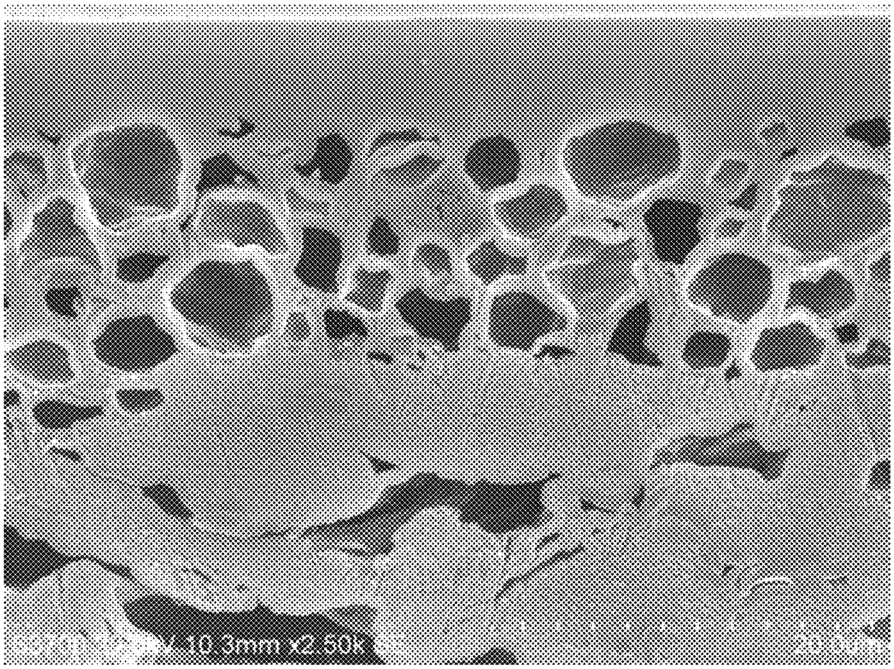
FIG. 3A is an example of a scanning microscopic image illustrating a cross-section of the thermosensitive recording medium of Comparative Example 1.
Figure 3B:
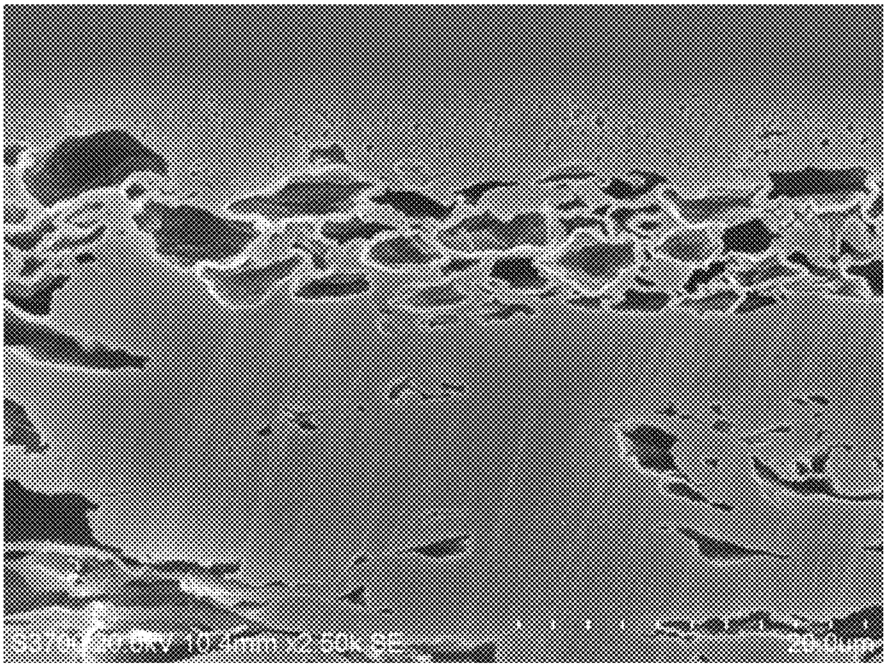
FIG. 3B is another example of a scanning microscopic image illustrating a cross-section of the thermosensitive recording medium of Comparative Example 1.

Note that, scanning microscopic images illustrating cross-sections "before calendaring" and "after calendaring" of the thermosensitive recording medium in Example 1 are presented in FIGS. 2A and 2B, respectively. Scanning microscopic images illustrating cross-sections "before calendaring" and "after calendaring" of the thermosensitive recording medium in Comparative Example 1 are presented in FIGS. 3A and 3B, respectively. As illustrated in FIGS. 2A and 2B, it was observed that the thermosensitive recording medium of Example 1 had almost no change in shape of the hollow fillers before and after calendaring (i.e., the hollow fillers were not crushed due to calendaring). In contrast, it was observed that the thermosensitive recording medium of Comparative Example 1, in which the hollow fillers including no hydrocarbon had been used for the under layer, had a change in shape of the hollow fillers before and after calendaring (i.e., the hollow fillers were crushed due to calendaring), as illustrated in FIGS. 3A and 3B.

For example, embodiments of the present disclosure are as follows.

<1> A thermosensitive recording medium including:

a base material;

a thermosensitive recording layer; and an under layer disposed between the base material and the thermosensitive recording layer and containing a non-thermally-expandable hollow filler, the thermosensitive recording medium containing a hydrocarbon, wherein an amount of the hydrocarbon having from 3 through 16 carbon atoms is 0.2 mg/m$^2$ or more relative to an area of the thermosensitive recording medium.

<2> The thermosensitive recording medium according to <1>, wherein the hollow filler contains the hydrocarbon, and wherein an amount of the hydrocarbon is 0.2% by mass or greater relative to a mass of the hollow filler.

<3> The thermosensitive recording medium according to <1> or <2>, wherein the hollow filler includes an outer shell which is formed of a polymer containing 80% by mass or greater of a nitrile-based monomer as a monomer unit.

<4> The thermosensitive recording medium according to any one of <1> to <3>, wherein the hollow filler has a volume average particle diameter of 6.0 micrometers or less.

<5> The thermosensitive recording medium according to any one of <1> to <4>, wherein the hollow filler has an average rate of hollowness of 71% or more.

<6> The thermosensitive recording medium according to any one of <1> to <5>, wherein the thermosensitive recording medium contains the hydrocarbon having a boiling point of 60 degrees C. or lower.

<7> The thermosensitive recording medium according to any one of <1> to <6>, wherein an Oken smoothness on a surface at a side of the thermosensitive recording layer is 1,000 s or more.

<8> A method for producing a thermosensitive recording medium, the method including:

forming, on a base material, an under layer including a hollow filler and a hydrocarbon; and forming a thermosensitive recording layer on the under layer.

The thermosensitive recording medium according to any one of <1> to <7> and the method for producing a thermosensitive recording medium according to <8> can solve the above-described existing problems and achieve the above-described objects.

REFERENCE SIGNS LIST

1 thermosensitive recording medium
11 base material
12 under layer
13 thermosensitive recording layer
14 protective layer
16 tackifier layer

The invention claimed is:

1. A thermosensitive recording medium comprising:

a base material;

a thermosensitive recording layer; and an under layer disposed between the base material and the thermosensitive recording layer and containing a non-thermally-expandable hollow filler, the thermosensitive recording medium containing a hydrocarbon, wherein an amount of the hydrocarbon having from 3 through 16 carbon atoms is 0.2 mg/m$^2$ or more relative to an area of the thermosensitive recording medium.

2. The thermosensitive recording medium according to claim 1, wherein the hollow filler contains the hydrocarbon, and wherein an amount of the hydrocarbon is 0.2% by mass or greater relative to a mass of the hollow filler.

3. The thermosensitive recording medium according to claim 1, wherein the hollow filler includes an outer shell which is formed of a polymer containing 80% by mass or greater of a nitrile-based monomer as a monomer unit.

4. The thermosensitive recording medium according to claim 1, wherein the hollow filler has a volume average particle diameter of 6.0 micrometers or less.

5. The thermosensitive recording medium according to claim 1, wherein the hollow filler has an average rate of hollowness of 71% or more.

6. The thermosensitive recording medium according to claim 1, wherein the thermosensitive recording medium contains the hydrocarbon having a boiling point of 60 degrees C. or lower.

7. The thermosensitive recording medium according to claim 1, wherein an Oken smoothness on a surface at a side of the thermosensitive recording layer is 1,000 s or more.

8. The thermosensitive recording medium according to claim 1, wherein the at least one hydrocarbon is at least one hydrocarbon selected from the group consisting of propane, (iso)butane, (iso)pentane, (iso)hexane, (iso)heptane, (iso)octane, (iso)nonane, (iso)decane, (iso)undecane, (iso)dodecane, (iso)tridecane, and (iso)hexadecane.

9. The thermosensitive recording medium according to claim 1, wherein the hollow filler comprises an outer shell which comprises a polymer comprising acrylonitrile (AN) and methacrylonitrile (MAN) in polymerized form.

10. The thermosensitive recording medium according to claim 9, wherein a mass ratio between acrylonitrile and methacrylonitrile (AN/MAN) in the polymer is 30/70 to 70/30.

11. The thermosensitive recording medium according to claim 1, wherein the wherein the hollow filler comprises an outer shell which comprises methyl methacrylate (MMA) in polymerized form.

* * * * *